United States Patent [19]

Uesaka et al.

[11] Patent Number: 5,028,496

[45] Date of Patent: Jul. 2, 1991

[54] MAGNETIC COATED RECORDING MEDIUM AND METHOD OF MANFACTURING THE SAME

[75] Inventors: Yasutaro Uesaka, Kokubunji; Hajime Fukke, Tama; Katsuyoshi Chiba, Hachioji; Iwao Matsuyama, Sagamihara, all of Japan

[73] Assignee: Hitachi, Ltd., Tokyo, Japan

[21] Appl. No.: 263,770

[22] Filed: Oct. 28, 1988

[30] Foreign Application Priority Data

Oct. 30, 1987 [JP] Japan .............................. 62-272943

[51] Int. Cl.$^5$ .......................................... G11B 23/00
[52] U.S. Cl. .................................. 428/694; 428/900
[58] Field of Search ............... 428/694, 900; 427/48, 427/130

[56] References Cited

U.S. PATENT DOCUMENTS

| | | | |
|---|---|---|---|
| 4,332,834 | 6/1982 | Takei | 427/48 |
| 4,678,682 | 7/1987 | Asai et al. | 427/48 |
| 4,791,032 | 12/1988 | Komatsu et al. | 427/48 |
| 4,824,708 | 4/1989 | Suzuki et al. | 428/64 |

OTHER PUBLICATIONS

Technical Data MR67-18 (1967) of the Society for Research of Magnetic Recording in Inst. of Electro. and Commun. Eng. of Japan, pp. 1–15.

IEEE Trans. Magnetics, Mag-20, pp. 81–83 (1984).

*Primary Examiner*—Paul J. Thibodeau
*Attorney, Agent, or Firm*—Pennie & Edmonds

[57] ABSTRACT

The present invention proposes a ratio of an applied field $H_s$ to a coercivity $H_c$ as a parameter which gives an influence to the write/read characteristics of a magnetic coated recording medium, especially, a reproduction output $E_o$ at a low recording density and a recording density $D_{50}$ which provides an output of the half of $E_o$. By selecting the ratio $H_s/H_c$ to be not larger than 2.1, a magnetic coated recording medium having large values of $E_o$ and $D_{50}$ or suited to a high density magnetic recording can be provided with good reproducibility.

2 Claims, 3 Drawing Sheets

MAGNETIC COATED RECORDING MEDIUM AND METHOD OF MANFACTURING THE SAME

BACKGROUND OF THE INVENTION

The present invention relates to a magnetic recording medium suited to a high density magnetic recording, more particularly, a magnetic coated recording medium and also relates to a method of manufacturing the same.

Hitherto, the properties of a magnetic recording medium are defined by the film thickness $\delta$, coercivity $H_c$, residual saturation magnetization $M_r$ and squareness $M_r/M_s$ ($M_s$: saturation magnetization) of the medium. See pages 1–15 of technical data MR 67-18 (1967) of the Society for Research of Magnetic Recording in Inst. of Electro. and Commun. Eng. of Japan. However, it does not necessarily follow that magnetic recording media having the same value in each of the parameters of $H_c$, $M_r$ and $M_r/M_s$ exhibit the same write/read characteristics when the writing in and reading from their media are made by use of the same head. For such circumstances, IEEE trans. Magnetics, MAG-20, pp. 81-83 (1984) has proposed indexes S*, S', $\Delta h_c$, and $\Delta h_r$. Here S* is the gradient at coercivity in magnetization curve, S' is the gradient at remanent coercivity in remanent magnetization curve, $\Delta h_c$ is so called switching field distribution, that is, half width of a differential magnetization curve normalized by the coercivity, and $\Delta h_r$ is so called residual switching field distribution, that is, half width of a differential residual magnetization curve normalized by the residual coercivity. But, even if such a new parameter is used, a sufficiently good correspondence cannot be obtained between the properties of a recording medium and the read/write characteristics thereof, especially, an output $E_o$ at a low density and a recording density $D_{50}$ which provides an output of the half of $E_o$.

As another parameter of the medium is the magnitude $H_s$ of an applied field with which the magnetization upon increase of the applied field and the magnetization upon decrease of the applied field begin to coincide with each other (or begins to separate from each other) in a main magnetization curve. However, only the correlation of $H_s$ with a magnetic motive force has hitherto been considered, as is discussed in pages 1–15 of technical data MR 67-18 (1967) of the Society for Research of Magnetic Recording in Inst. of Electro. and Commun. Eng. of Japan mentioned above.

The definition of each of the above-mentioned parameters is illustrated in FIG. 1a or 1b. In FIG. 1a, the ordinate represents the magnitude of the magnetization of a medium and the abscissa represents the magnitude of an applied field. In FIG. 1b, the ordinate represents the magnitude of a reproduction output and the abscissa represents the recording density.

Because of a lack of enough grasp of parameters corresponding to the write/read characteristics, the above-mentioned prior art cannot give a complete guide to what medium should be used in order to attain a high density magnetic recording.

SUMMARY OF THE INVENTION

An object of the present invention is to provide a magnetic coated recording medium in which a higher density magnetic recording is possible and to provide a method of manufacturing such a magnetic coated recording medium.

To that end, a magnetic recording medium in which $H_s/H_c$ is not larger than 2.1 and not smaller than 1.0 is used in the present invention. $H_s$ is the magnitude of an applied field with which the magnetization upon increase of the applied field in a major magnetization curve and the magnitude upon decrease of the applied field in the major magnetization curve begin to coincide with each other. $H_c$ is a coercivity.

The contents of the present invention will now be explained in detail.

The present inventors have made computer simulations of write/read with the parameters of $\delta$, $H_c$, $M_s$ and $M_r/M_s$ made coincident with the experimental values thereof. The write/read computer simulations have been made with the other medium parameters of S*, S', $\Delta h_c$, $\Delta h_r$ and $H_s/H_c$ made coincident with the experimental values thereof, respectively. FIG. 2 comparatively shows the experimental values of the write/read characteristics and the computer simulations of write/read characteristics when S*, $\Delta h_c$ and $H_s/H_c$ are made to coincide with their experimental values, respectively. In FIG. 2, the abscissa represents a recording frequency which is a quantity proportional to the recording density shown in FIG. 1b. The ordinate of FIG. 2 represents a normalized output, that is, a value which is obtained by dividing a reproduction output by the speed of a disk relative to a heat, a track width and the number of wirings of the head. The result of the computer simulation in the case where S' is made coincident with its experimental value, is approximately the same as that in the case where S* is made coincident with its experimental value. Also, the result of the computer simulation in the case where $\Delta h_r$ is made coincident with its experimental value, is approximately the same as that in the case where $\Delta h_c$ is made coincident with its experimental value. A magnetic powder for the magnetic disk used in the experiment shown in FIG. 2 is acicular magnetic particles of Co—$\gamma$—$Fe_2O_3$ having a coercivity of 660 Oe. The magnetic head used for measurement is a head which is made of MnZn ferrite and has a gap length of 0.5 $\mu$m and a head flying height amount of 0.2 $\mu$m. As shown in FIG. 2, when $H_s/H_c$ is used as a medium parameter in addition to $\delta$, $H_c$, $M_s$ and $M_r/M_s$, the computer simulation can provide a better reemergence of the experimental result of the write/read characteristics. Namely, it has been clarified that $H_s/H_c$ rather than S*, S', $\Delta h_c$ and $\Delta h_r$ is a parameter which is important to the write/read characteristics.

Next, the present inventors have severally changed $\delta$, $H_c$, $M_s$, $M_r/M_s$ and $H_s/H_c$ to determine an influence which each of these parameters gives to $E_o$ and $D_{50}$ and have made the multi-fluent analysis of the results. The analysis results in the following relations:

$$E_o \propto \delta^{0.55} H_c^{0.27} M_s^{0.74} (M_r/M_s)^{0.91} (H_s/H_c)^{-0.90} \quad (1)$$

$$D_{50} \propto \delta^{-0.56} H_c^{0.26} M_s^{-0.24} (M_r/M_s)^{-0.22} (H_s/H_c)^{-0.76} \quad (2)$$

As is seen from the relation (1), the squareness $M_r/M_s$ gives the greatest influence to $E_o$ and $H_s/H_c$ also gives a substantially equal degree of influence. In the relation (2), $H_s/H_c$ gives the greatest influence to $D_{50}$. Accordingly, if $H_s/H_c$ is decreased, $E_o$ and $D_{50}$ are both increased.

The measured value of $H_s/H_c$ of a magnetic coated recording medium for a fixed disk manufactured by use of the conventional method was larger than 2.1 but not larger than 2.4. Therefore, under a presumption that the write/read characteristics of the magnetic disk can be further improved by making the value of $H_s/H_c$ not larger than 2.1, the present inventors have tried to decrease $H_s/H_c$ by a method which will be described hereinbelow. Hereupon, it is noted that a state in which $H_s/H_c$ is smaller than 1 means that a magnetization curve includes a portion having a negative gradient. Such a state is not stable in principle, as is described by W. F. Brown; Micromagnetics, pp. 49-51 (1963), Interscience Publishers.

Causes for increase of $H_s$ in a magnetic coated recording medium include the dispersions in magnitude and direction of magnetic anisotropy of a magnetic powder or magnetic particles. The present inventors have removed those causes by use of the following means. Namely, in order to reduce the dispersion in magnitude of the magnetic anisotropy, a classification treatment based on the so-called jet method using a high pressure air was carried out. In order to suppress the dispersion in direction of the magnetic anisotropy, the direction of the magnetic powder was inversed many times by disposing four or more permanent magnets on the side of an undried magnetic film or on the side of the substrate side in a process stage for aligning the direction of easy magnetization axis of the magnetic powder upon application of a magnetic field after a magnetic paint has been spin-coated on the substrate.

By the above-mentioned method, $H_s/H_c$ could be reduced to a value not larger than 2.1.

The measurement of the write/read characteristics of the recording medium thus treated has revealed that $E_o$ and $D_{50}$ of this recording medium are improved by about 30% and 18%, respectively, in comparison with the conventional recording medium. These degrees of improvement substantially correspond to values preestimated from the above-mentioned relations (1) and (2).

The classification of the magnetic powder or particles using the high pressure air reduces the dispersion in magnitude of the magnetic anisotropy of the magnetic powder and the repeated inversion of the magnetic powder after coating thereof reduces the dispersion in direction of the magnetic anisotropy of the magnetic powder. The reduction of both of those dispersions causes $H_s/H_c$ of the recording medium to reduce to a value not larger than 2.1, thereby providing a magnetic recording medium in which the values of $E_o$ and $D_{50}$ are large.

DESCRIPTION OF THE PREFERRED EMBODIMENTS

The present invention will now be explained by virtue of embodiments thereof.

Acicular magnetic particles of 600 parts by weight having a coercivity of 600 Oe and a magnetic anisotropy made uniform in magnitude thereof through a classification treatment using a high pressure air, butyral resin of 60 parts by weight, and monocrystalline alumina of 20 parts by weight having a particle diameter of 0.5 μm were thrown into a kneader and were kneaded or mixtured for about fifteen minutes. Thereafter, cellosolve acetate of 800 parts by weight was gradually added and the kneading was carried out for about eight hours. Within the kneaded mixture, 690 parts by weight were put into a ball mill pot with cellosolve acetate of 350 parts by weight further added and the ball milling was carried out for three days to disperse the magnetic particles. Next, a solution in which phenol intermediate of 56 parts by weight units having a molecular weight of about 300 and epoxy resin of 56 parts by weight are dissolved into butyl cellosolve of 770 parts by weight, was added to prepare a magnetic paint. The magnetic paint thus obtained was spin-coated on an aluminum substrate of 14-inch diameter having a preliminarily cleaned surface and was subjected to a magnetic orientation treatment, and the magnetic film was cured.

Figure 1A:
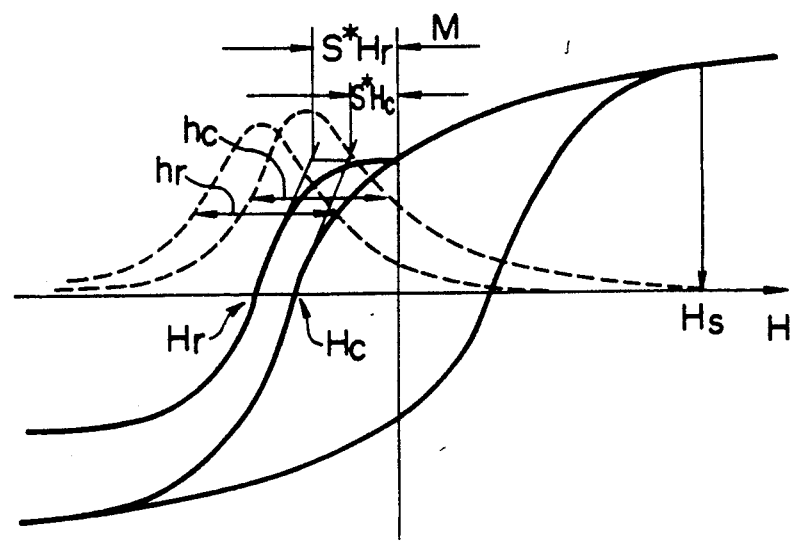
FIGS. 1a and 1b are views for explaining medium parameters used for the explanation of the present invention.
Figure 1B:
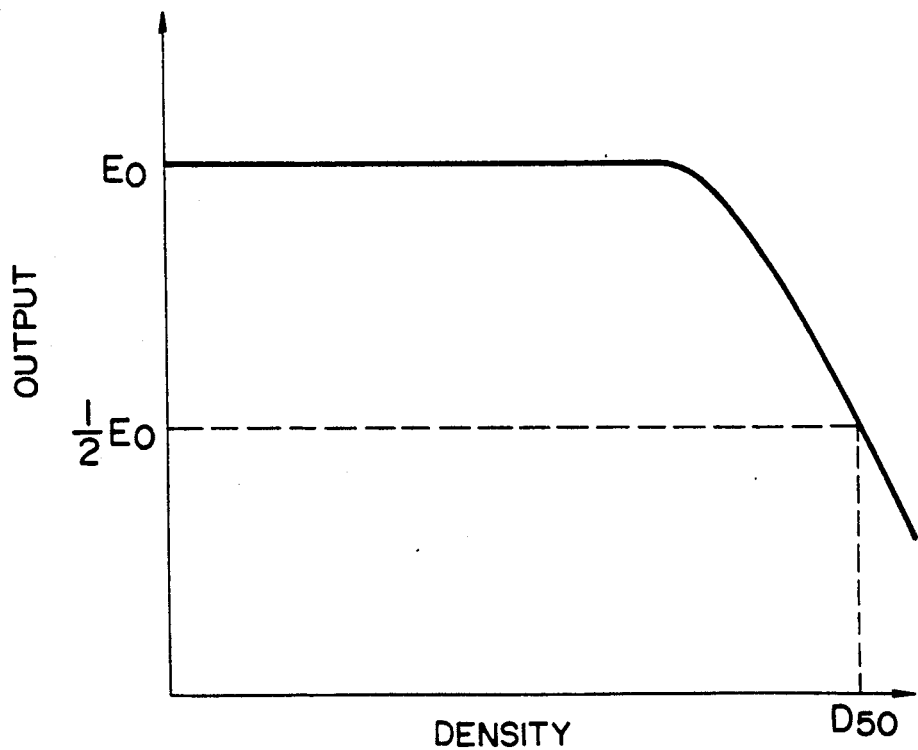
Figure 2:
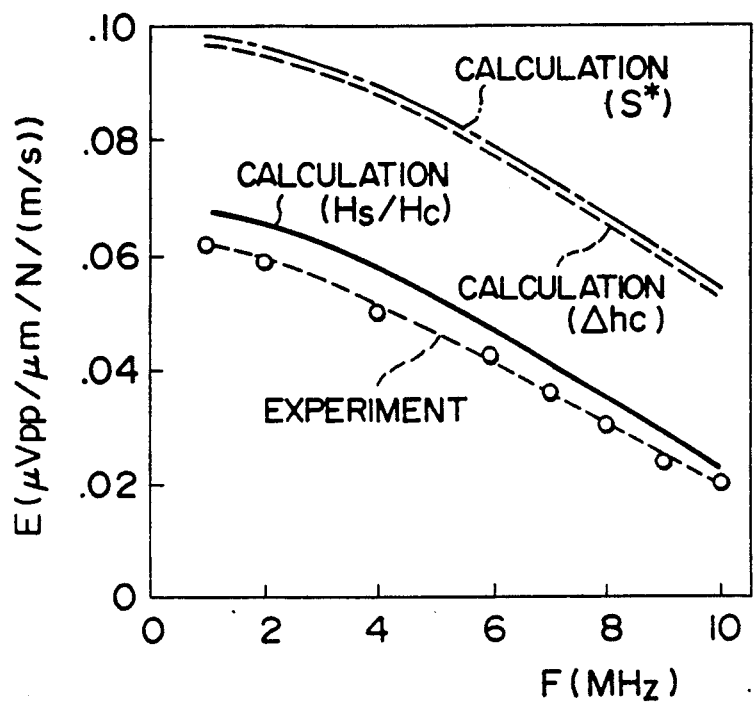
FIG. 2 is a graph comparatively showing experimental values of the write/read characteristics and calculated values thereof obtained by computer simulations in which S*, $H_s/H_c$ and $\Delta h_c$ as well as $H_c$ (coercivity), $M_s$ (saturation magnetization), $M_r/M_s$ (squareness) and $\delta$ (film thickness) among the magnetic properties of a recording medium are made coincident with experimental values thereof, respectively.
Figure 3:
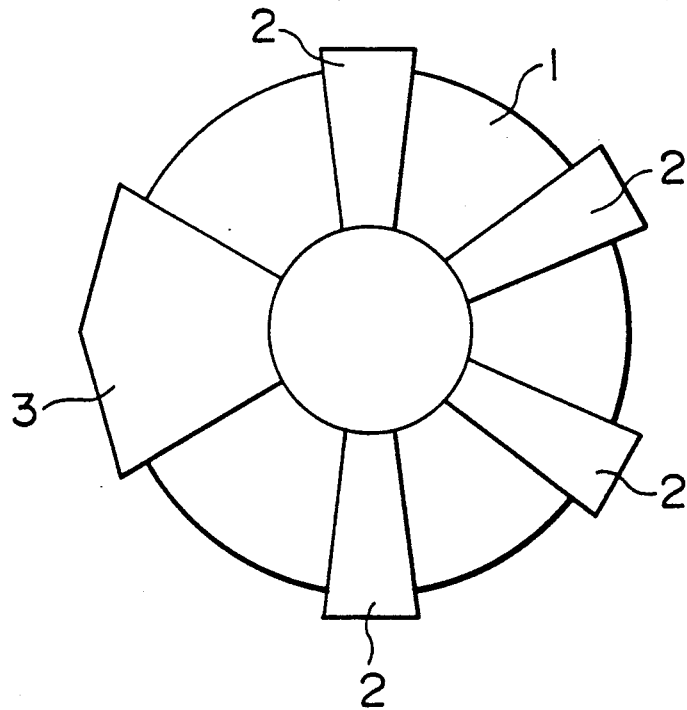
FIGS. 3 and 4 are front and side views of the arrangement of permanent magnets used upon magnetic orientation in an embodiment of the present invention.
Figure 4:
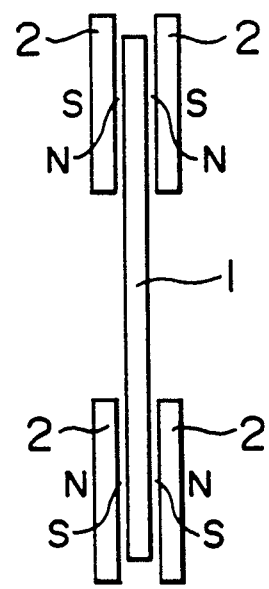

In carrying out the magnetic orientation treatment, four small permanent magnets 2 and one large permanent magnet 3 are disposed on one side of a disk 1 while four small permanent magnets 2 and one large permanent magnet 3 are disposed on the other side of the disk 1 at positions corresponding to the magnets 2 and 3 on the one side of the disk and in a form paired therewith, as shown in a front view of FIG. 3 and a side view of FIG. 4. The used permanent magnets are made of Nd-Fe-B. A distance between the magnetic film and the permanent magnets disposed on the magnetic film side of the disk 1 was 1 mm. Next, the magnetic film was cured and was subjected to a surface finishing treatment to obtain a film thickness of 0.3 μm.

The write/read characteristics of the magnetic disk thus obtained were measured by use of an MnZn ferrite head having a gap length of 0.5 μm. The results of measurement are shown in Table 1 together with the magnetic properties of the magnetic disk.

TABLE 1

|  | $E_o$ (mV) | $D_{50}$ (kFCI) | $H_c$ (Oe) | $H_s/H_c$ | $4\pi M_s$ (G) | $M_r/M_s$ |
|---|---|---|---|---|---|---|
| Embodiment | 0.30 | 33 | 660 | 1.70 | 1300 | 0.83 |
| Comparative Example | 0.23 | 28 | 680 | 2.18 | 1250 | 0.80 |

Figure 5:
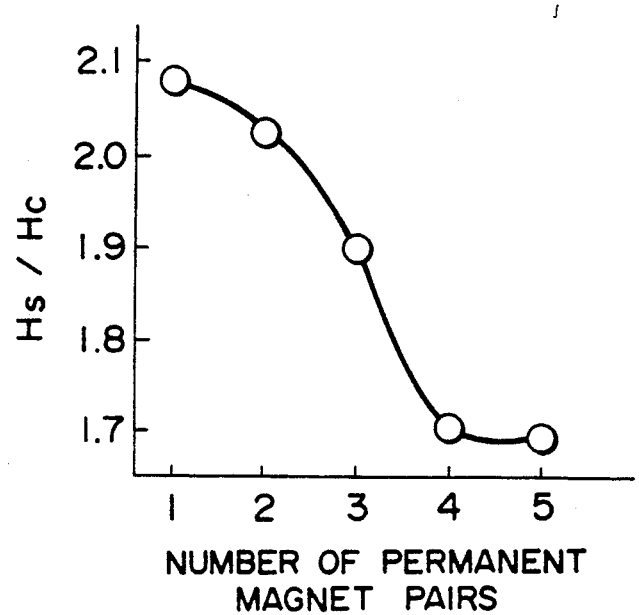
FIG. 5 is a graph showing a relation between $H_s/H_c$ and the number of permanent magnet pairs used when a coated film is subjected to a magnetic orientation treatment.

The values of $H_s/H_c$ in the case where the number of permanent magnets used in carrying out the magnetic orientation treatment was changed are shown in FIG. 5. As is seen from the figure, the value of $H_s/H_c$ becomes substantially constant when the number of magnets used is selected to be not smaller than 4.

COMPARATIVE EXAMPLE

Figure 6:
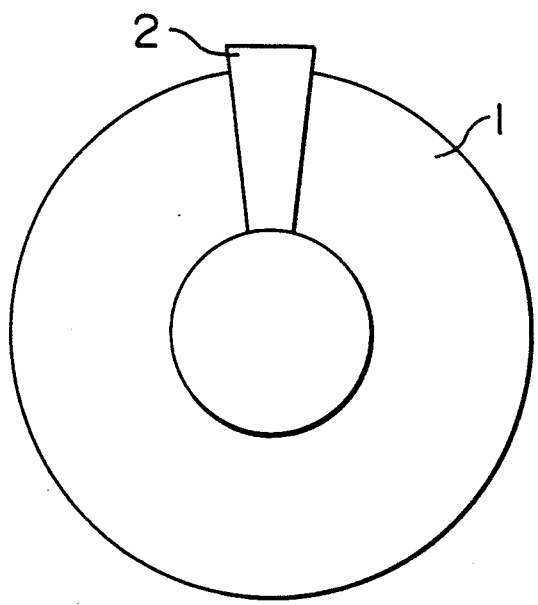
FIGS. 6 and 7 are front and side views of the arrangement of permanent magnets used upon magnetic orientation in an example to be compared with the embodiment of the present invention.
Figure 7:
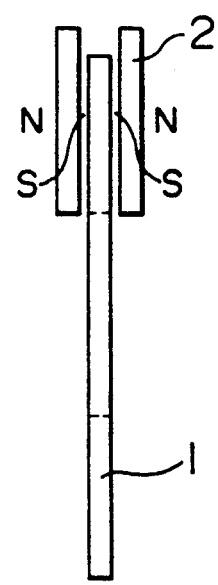

As a comparative example, the acicular magnetic particles having the coercivity of 600 Oe used in the above-mentioned embodiment were used without being subjected to the classification treatment and a magnetic paint was prepared through the same process steps as those employed in the embodiment. The magnetic paint obtained was spin-coated on an aluminum substrate of 14-inch diameter having a preliminarily cleaned surface and was subjected to a magnetic orientation treatment. The magnetic film was cured and was thereafter surface-finished. The thickness of the magnetic film after surface-finishing thereof was 0.3 $\mu$m. The magnetic orientation treatment was carried out by use of one pair of small permanent magnets 2, as shown in a front view of FIG. 6 and a side view of FIG. 7.

Next, the write/read characteristics of the magnetic disk thus obtained were measured by use of the MnZn ferrite head having the gap length of 0.5 $\mu$m. The results of measurement as well as the magnetic properties of the magnetic disk according to the comparative example are shown in Table 1.

From the magnetic properties shown in Table 1 and the above-mentioned relations (1) and (2), it is preestimated that $E_o$ in the embodiment is larger than $E_o$ in the comparative example by 32% and $D_{50}$ in the embodiment is larger than $D_{50}$ in the comparative example by 18%. According to the experiments, on the other hand, $E_o$ in the embodiment is larger than $E_o$ in the comparative example by 30% and $D_{50}$ in the embodiment is larger than $D_{50}$ in the comparative example by 18%. Namely, a very sufficient coincidence is obtained between the experimental results and the preestimation based on the relations (1) and (2).

From the relation (1) and Table 1, it is estimated that the degrees of contribution of $M_r/M_s$, $M_s$, $H_c$ and $H_s/H_c$ for a portion of $E_o$ in the embodiment increased from $E_o$ in the comparative example are 3%, 3%, $-1$% and 25%, respectively. From the relation (2) and Table 1, it is estimated that the degree of contribution of $H_s/H_c$ for a portion of $D_{50}$ in the embodiment increased from $D_{50}$ in the comparative example is 21% and the degree of contribution of each of $H_c$, $M_s$ and $M_r/M_s$ is $-1$%. Namely, it is regarded that the most of the increase of each of $E_o$ and $D_{50}$ in the embodiment is originated from the decrease of $H_s/H_c$.

As is apparent from the foregoing, according to the present invention, the write/read characteristics can be improved, thereby making a high density magnetic recording possible.

We claim:

1. A magnetic longitudinally oriented particulate recording medium comprising a substrate and a plurality of longitudinally oriented magnetic particles in a binder coated on said substrate, said recording medium having a ratio $H_s/H_c$ not larger than 2.1 and not smaller than 1.0, $H_s$ being a point in a magnetization curve of said medium at which a segment of said curve corresponding to a magnetization caused by an increase of an applied field and a segment of said curve corresponding to a magnetization caused by a decrease of an applied field become co-incident with each other, and $H_c$ being the coercivity.

2. A magnetic coated recording medium according to claim 1, wherein said longitudinally oriented magnetic particles used for said magnetic film are acicular magnetic particles.

* * * * *